UNITED STATES PATENT OFFICE.

HERBERT SAMUEL ELWORTHY, OF ST. ALBANS, ENGLAND.

MANUFACTURE OF GAS FOR ILLUMINATING, HEATING, OR POWER PURPOSES.

950,067.     Specification of Letters Patent.    Patented Feb. 22, 1910.

No Drawing.     Application filed May 26, 1905. Serial No. 262,477.

*To all whom it may concern:*

Be it known that I, HERBERT SAMUEL ELWORTHY, of Battlefield Road, St. Albans, in the county of Herts, England, have invented certain new and useful Improvements in the Manufacture of Gas for Illuminating, Heating, or Power Purposes, of which the following is a specification.

This invention relates to the manufacture and production of a cheap and economical gas or mixture of gases suitable for heating, lighting and power purposes.

By this invention a cheap and valuable gas for the purposes mentioned can be secured equal in heating and lighting value to coal gas and free from the objection of forming naphthalene and similar deposits in the mains.

The gas obtained by the present invention possesses the very great technical advantage that while it can be produced in a cheap and economical way it is substantially free from the toxic properties of carbon monoxid, the presence of which forms such a serious objection to the use of water gas and in the cheaper forms of gas hitherto employed. By the present invention the carbon monoxid is removed and in its place the valuable and non-toxic constituent methane is substituted.

In the specifications of previous patents Nos. 738,303 and 777,848 there are described various processes of preparing gas for illuminating or other purposes by subjecting water gas of any kind to the action of nickel at a suitable temperature or temperatures and in the presence of theoretically sufficient hydrogen for the conversion of carbon monoxid or carbon dioxid (or both) of the water gas into methane and water on contact with the nickel, one or other of the oxids of carbon being in some cases removed prior to the reaction. There are also described in the specification of an application for U. S. patent filed simultaneously herewith various methods of making gas by subjecting any gas obtained from the destructive distillation of coal, bitumen, or other similar source, mixed or not with water gas, Dowson gas, producer gas or equivalent gas to the action of metallic nickel at a suitable temperature or temperatures to convert the oxid or oxids of carbon and hydrogen present into methane and water. In these latter methods, heavy hydrocarbons are removed prior to the reaction, while hydrogen is sometimes added to bring the percentage thereof up to the required theoretical proportion for the reaction. In some cases one of the oxids of carbon is removed prior to the reaction, and in others a combined coal and water gas is used for the reaction. For convenience I will refer to the various reaction mixtures employed in the two said specifications as the "water gas reaction mixture" and the "coal gas reaction mixture" respectively. The term "water gas" in the present application includes any gas made by passing steam through heated carbonaceous fuel, while the term "coal gas" includes any gas obtained by the destructive distillation of coal, bitumen or other similar material.

In all the methods above referred to the reaction gas or mixture subjected to the action of the nickel contains hydrogen in about the theoretical proportion corresponding with the formula of conversion, and where less than this proportion of hydrogen is present, it is generally added to approximately make up the theoretical proportion. The gases in all cases undergo a considerable shrinkage as the result of the reaction. I have now found as the result of further study and practical trials that in all the methods or processes above referred to, the reaction can be greatly facilitated and a much more complete conversion of the reaction gases into methane effected in the nickel chamber by conducting the reaction in the presence of a considerable excess of hydrogen, or it may be in the presence of methane, or of a mixture of both, or in the presence of another combustible gas inert to the nickel and conversion products. By employing an excess of hydrogen I am enabled to compensate for the shrinkage which the converted gases undergo in the reaction, while at the same time facilitating the conversion as explained. The conversion may be effected at the same temperature or temperatures as in the said specifications, viz., about 250° C. for the monoxid and about 350° C. for the dioxid, care being taken to regulate the temperature of the reaction, which is exothermic, within the required limits.

According to the present invention I may add a suitable quantity of methane to the water gas reaction mixture or coal gas reaction mixture, containing hydrogen in substantially theoretical proportion for the conversion of the oxid or oxids of carbon present, and I am thus enabled to obtain, after the conversion, a gas consisting substantially of methane. The added methane may be conveniently obtained from a preceding reaction or stage of the working. As a general example the methane may be added to any of the water gas reaction mixtures or coal gas reaction mixtures referred to, in say equal proportions, but it will be understood that the invention is in no way confined to any particular proportions, and that these may be varied within wide limits, according to the nature of the gas or mixture to be treated.

An important feature of my invention is to employ an excess of hydrogen for the purpose of facilitating and improving the conversion, and obtaining a cheap combined mixture of the gases. This excess of hydrogen is not attacked but causes the reaction to proceed with greater regularity, facility and safety. The oxid or oxids of carbon present in the water gas reaction mixture or coal gas reaction mixture, and an equivalent proportion of the hydrogen, are very effectually transformed into methane, and the excess hydrogen mixes with the methane produced, so that a very valuable gas consisting practically entirely of methane and hydrogen can be obtained, having a high calorific power and substantially free from the poisonous properties of carbon monoxid and the disadvantageous presence of carbon dioxid. Such a gas has never been industrially available and I reserve the right to such gas broadly, as a new article of manufacture, which owing to the cheapness of its production is of great economic importance. To illustrate this part of the invention I will take as an example an ordinary water gas consisting in substance of carbon monoxid and hydrogen. The amount of hydrogen here theoretically required for the conversion is indicated by the formula:—

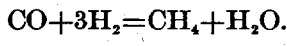

$$CO + 3H_2 = CH_4 + H_2O.$$

Now by adding hydrogen to this water gas until there are, for example about three volumes of hydrogen present in the mixture in excess of that theoretically required, and then passing the mixture over the nickel at the proper temperature, a gas may be obtained possessing a calorific power practically equal to that of ordinary coal gas, and equally suitable, or even more suitable, than ordinary coal gas for incandescent lighting purposes. Such gas, with an equal, or even less consumption, allows of obtaining an equal lighting power to that of ordinary coal gas with an ordinary Welsbach burner and mantle. The excess hydrogen may be mixed with the water gas reaction mixture or coal gas reaction mixture prior to its passage over the nickel, or the production of the water gas or coal gas may be conducted in any suitable way to secure the presence of the surplus hydrogen in the gas. The requisite quantity of surplus hydrogen may be added to the mixture after the conversion as hereinafter mentioned. By varying the amount of the excess hydrogen, I may increase or diminish the richness of the gas made to suit different requirements. The calorific power of the gas can be increased by reducing the amount of the excess hydrogen, and the gas can then be advantageously mixed with coal gas or other combustible gas of too low a calorific power, and in this way I may obtain gas of any desired illuminating and calorific power. With a similar object I may also according to my invention add to illuminating gas of low calorific power the gas obtained by effecting the conversion in the presence of methane as hereinbefore described. Or the gas produced in this latter way or by carrying out the reaction in the presence of excess hydrogen, may be added to coal gas or lighting gas generally or to any other combustible gas to meet different requirements. If desired a mixture of methane and excess of hydrogen may be added to the reaction gases before conversion in the nickel chamber.

The new gas obtained by conducting the conversion in the presence of excess hydrogen may be carbureted if desired, being moreover very susceptible of practical and economical enrichment in this way. This may be performed in any suitable way. It can be effected for example in a similar manner to that used for water gas, the consumption of carbureting agent employed being however much less than required for water gas for a given illuminating power. I may with great advantage carburet the gas when required by passing it through retorts of ordinary or suitable type wherein the distillation of coal or the like is being conducted for the production of gas. In this way the gas passed through the retorts will to a large extent prevent decomposition of the higher hydrocarbons produced from the coal, and is enriched by these hydrocarbons. By this means a gas of high calorific and illuminating value may be produced without the use of any other carbureting agent, but this gas may be further carbureted if desired. The gas obtained by carrying out the conversion in presence of methane or other combustible gas inert to the nickel and conversion products (with or without excess hydrogen) may also be carbureted as just explained or in any other suitable way.

The improved type of hydrogen generator described in said prior patent No. 777,848 is preferably used for producing the hydrogen employed for the purposes of the present invention, as this generator permits of obtaining the said gas with the greatest economy.

It will be understood that the sulfur, ammonia and other impurities should be removed from the reaction gases before they are passed through the conversion chambers, and where coal gas or like gas is used in the conversion, the higher hydrocarbons thereof should be previously removed. It is not necessary to remove the carbon dioxid unless the monoxid only is to be converted.

In cases where the gas or mixture to be subjected to the action of the nickel contains carbon monoxid and carbon dioxid in sufficient proportion and it is desired to convert both into methane by combination with the hydrogen present, the gas or mixture can be led first over nickel at a suitable temperature for the conversion of the monoxid and then over further nickel at a suitable temperature for the conversion of the dioxid.

What I claim and desire to secure by Letters Patent is:—

1. A process for the manufacture of a gas for lighting, heating or power purposes, consisting in passing a combustible gas containing oxid of carbon and hydrogen in quantity sufficient to effect conversion into marsh gas, together with a large quantity of a combustible gas inert to nickel and conversion products, in contact with nickel at a suitable temperature for the conversion of said oxid and hydrogen into methane and water.

2. A process for the manufacture of a gas for lighting, heating or power purposes, consisting in producing a combustible gas containing carbon monoxid, carbon dioxid and hydrogen, removing one of said oxids and passing the remaining gas containing the other oxid and hydrogen in quantity sufficient to effect conversion into marsh gas, together with a large quantity of a combustible gas inert to nickel and conversion products, in contact with nickel at a suitable temperature for the conversion of the said remaining oxid and hydrogen into methane and water.

3. A process for the manufacture of a gas for lighting, heating or power purposes consisting in passing a combustible gas containing carbon monoxid, carbon dioxid and hydrogen in quantity sufficient to effect conversion into marsh gas, together with a large quantity of a combustible gas inert to nickel and conversion products, first over nickel at a suitable temperature for the conversion of the monoxid and then over further nickel at a suitable temperature for the conversion of the dioxid.

4. A process for the manufacture of a gas for lighting, heating or power purposes, consisting in passing a gas containing oxid of carbon together with hydrogen in large excess of the proportion required for the conversion of said oxid into methane and water in contact with nickel at a suitable temperature for the conversion of the oxid and hydrogen into methane and water.

5. A process for the manufacture of a gas for lighting, heating or power purposes consisting in passing any form of water gas containing oxid of carbon, together with hydrogen in large excess of the proportion required for the conversion of said oxid into methane and water in contact with nickel at a suitable temperature for the said conversion.

6. A process for the manufacture of a gas for lighting, heating or power purposes, consisting in passing water gas containing carbon monoxid, together with hydrogen in large excess above the proportion required for conversion of the monoxid into methane and water, in contact with nickel at a suitable temperature for the said conversion.

7. A process for the manufacture of a gas for lighting, heating or power purposes, consisting in passing a mixture of a coal gas and a water gas, containing oxid of carbon, together with hydrogen in large excess above the proportion required for the conversion of the oxid of carbon into methane and water, over nickel, at a suitable temperature for said conversion.

8. A process for the manufacture of a gas for lighting, heating or power purposes, consisting in producing a combined coal and water gas containing oxid of carbon and passing said gas together with hydrogen in large excess of the proportion required for the conversion of the oxid of carbon into methane and water, in contact with nickel at a suitable temperature for said conversion.

9. A process for the manufacture of a gas for lighting, heating or power purposes, consisting in producing a combined coal and water gas containing carbon monoxid and carbon dioxid, removing the dioxid and passing the remaining gas, together with hydrogen in large excess of the proportion required for the conversion of the monoxid into methane and water, in contact with nickel at a suitable temperature for the said conversion.

10. A process for the manufacture of a gas for lighting, heating or power purposes, consisting in passing a combustible gas containing oxid of carbon and hydrogen in quantity sufficient to effect conversion into marsh gas, together with a large quantity of a combustible gas inert to nickel and conversion products, in contact with nickel at a suitable temperature for the conversion of said oxid and hydrogen into methane and water, and thereafter carbureting the gas by passing the same through retorts wherein coal is undergoing distillation.

11. A process for the manufacture of a gas for lighting, heating or power purposes, consisting in passing any form of water gas containing oxid of carbon, together with hydrogen in large excess of the quantity required for the conversion of the oxid of carbon into methane and water, over nickel at a suitable temperature for the said conversion, and thereafter carbureting the gas by passing the same through retorts wherein coal is undergoing distillation.

In witness whereof, I have hereunto signed my name in the presence of two subscribing witnesses.

HERBERT SAMUEL ELWORTHY.

Witnesses:
ROBERT MILTON SPEARPOINT,
H. D. JAMESON.

---

Correction in Letters Patent No. 950,067.

It is hereby certified that Letters Patent No. 950,067, granted February 22, 1910, upon the application of Herbert Samuel Elworthy, of St. Albans, England, for an improvement in "The Manufacture of Gas for Illuminating, Heating, or Power Purposes," were erroneously issued to the inventor, said Elworthy, whereas said Letters Patent should have been issued to *Ellen Gertrude Elworthy, administratrix* of said Herbert Samuel Elworthy, deceased; and that the said Letters Patent should be read with this correction therein that the same may conform to the record of the case in the Patent Office.

Signed and sealed this 22d day of March, A. D., 1910.

[SEAL.]

C. C. BILLINGS,
*Acting Commissioner of Patents.*

11. A process for the manufacture of a gas for lighting, heating or power purposes, consisting in passing any form of water gas containing oxid of carbon, together with hydrogen in large excess of the quantity required for the conversion of the oxid of carbon into methane and water, over nickel at a suitable temperature for the said conversion, and thereafter carbureting the gas by passing the same through retorts wherein coal is undergoing distillation.

In witness whereof, I have hereunto signed my name in the presence of two subscribing witnesses.

HERBERT SAMUEL ELWORTHY.

Witnesses:
ROBERT MILTON SPEARPOINT,
H. D. JAMESON.

---

Correction in Letters Patent No. 950,067.

It is hereby certified that Letters Patent No. 950,067, granted February 22, 1910, upon the application of Herbert Samuel Elworthy, of St. Albans, England, for an improvement in "The Manufacture of Gas for Illuminating, Heating, or Power Purposes," were erroneously issued to the inventor, said Elworthy, whereas said Letters Patent should have been issued to *Ellen Gertrude Elworthy, administratrix* of said Herbert Samuel Elworthy, deceased; and that the said Letters Patent should be read with this correction therein that the same may conform to the record of the case in the Patent Office.

Signed and sealed this 22d day of March, A. D., 1910.

[SEAL.]

C. C. BILLINGS,
*Acting Commissioner of Patents.*

It is hereby certified that Letters Patent No. 950,067, granted February 22, 1910, upon the application of Herbert Samuel Elworthy, of St. Albans, England, for an improvement in "The Manufacture of Gas for Illuminating, Heating, or Power Purposes," were erroneously issued to the inventor, said Elworthy, whereas said Letters Patent should have been issued to *Ellen Gertrude Elworthy, administratrix* of said Herbert Samuel Elworthy, deceased; and that the said Letters Patent should be read with this correction therein that the same may conform to the record of the case in the Patent Office.

Signed and sealed this 22d day of March, A. D., 1910.

[SEAL.]

C. C. BILLINGS,
*Acting Commissioner of Patents.*